United States Patent [19]

Ecole

[11] 4,350,938
[45] Sep. 21, 1982

[54] TRAVEL LIMIT STOP DEVICE FOR A MOTOR-REDUCING UNIT INTENDED IN PARTICULAR FOR A WINDOW WIPER

[75] Inventor: Auguste Ecole, Paris, France

[73] Assignee: Equipements Automobiles Marchal, Issy-les-Moulineaux, France

[21] Appl. No.: 253,852

[22] PCT Filed: Jan. 4, 1980

[86] PCT No.: PCT/FR80/00002
§ 371 Date: Sep. 4, 1981
§ 102(e) Date: Apr. 1, 1981

[87] PCT Pub. No.: WO81/01985
PCT Pub. Date: Jul. 23, 1981

[51] Int. Cl.³ .............................................. H02P 1/04
[52] U.S. Cl. ............................. 318/443; 318/DIG. 2; 318/466
[58] Field of Search ......... 318/443, 444, 466, DIG. 2; 15/250.12, 250.13, 250.17; 200/11 D, 11 G, 11 DA, 292

[56] References Cited

U.S. PATENT DOCUMENTS 2,777,907  1/1957  Hooker ............................ 200/11 G
3,030,460  4/1962  Huetten et al. ............. 2000/11 DA
3,095,597  7/1963  Waldron ........................... 15/250.17
3,483,459  12/1969  Kearns ........................... 318/444 X

FOREIGN PATENT DOCUMENTS 1513188  5/1967  France .
2428344  2/1980  France .

Primary Examiner—Ulysses Weldon
Attorney, Agent, or Firm—Brisebois & Kruger

[57] ABSTRACT

A travel limit stop device which can be used in particular for controlling a motor vehicle window wiper motor. This device comprises sliding contacts (20, 21) capable of displacement on concentric circular tracks of a connector (40), the co-operation of the sliding contacts (20, 21) and a connector (40) providing either for the supply to the associated electric motor or short-circuiting thereof; such a device is characterized in that the sliding contacts (20, 21) are carried by the output wheel (1) of the electric motor and the connector (40) which is fixed on the cover of the casing of said wheel comprises three electrically insulated conductor sectors (37, 38, 39) while the sliding contacts (20, 21) are electrically connected together.

12 Claims, 7 Drawing Figures

TRAVEL LIMIT STOP DEVICE FOR A MOTOR-REDUCING UNIT INTENDED IN PARTICULAR FOR A WINDOW WIPER

It is known that most window wiper drive mechanisms, in particular for motor vehicles, are provided with travel limit stop devices which permit the window wiper blade to be returned to a pre-determined rest position off the window surface to be wiped. Such a drive mechanism in most cases comprises a motor of permanent magnet inductor type, which is connected to a speed reducing unit comprising an endless worm whose threads engage with a toothed wheel carried by a shaft at right angles to the shaft of the worm. The reducing unit is housed within a sealed casing which is closed by a cover disposed facing the reducing wheel.

In a known embodiment, the travel limit stop device comprises a connector fixed to the front surface of the reducing wheel, the conductor sectors of which co-operate with three independent sliding contacts which are positioned and fixed on the cover of the casing. Each sliding contact comprises an elastically deformable curved metal blade whose free end carries a contact point which is fitted thereto and which slidingly co-operates with one of the three concentric circular tracks carried by the connector. The three sliding contacts are at different potentials, since one is connected to the supply circuit of the motor, the other is connected to the induction armature of the motor by a control switch and the third to ground.

A travel limit stop device of this kind becomes difficult to construct, from the mechanical point of view, when the motor reducing unit is to be miniaturised. In fact, the size of the connector is linked to the diameter of the reducing wheel which carries it so that a reduction in the size of the reducing wheel results in a reduction in the diameter of the connector and consequently results in the three sliding contacts which describe the three concentric circular tracks of the connector coming closer together. Now, the three sliding contacts are independent components which become particularly difficult to position relative to each other by virtue of the close tolerances which result from their coming closer together. In addition, the limit device is generally provided to operate irrespective of the direction of rotation of the motor or the reducing wheel. Accordingly, it is necessary to provide for two different arrangements in respect of the sliding contact carrier member on the cover of the casing, in order to take into account the direction of rotation of the reducing wheel, that is to say, two openings for receiving the sliding contact carrier member. It will be appreciated that the opening which is not in use is closed by a plug fitted thereto, as otherwise the casing of the reducing unit would no longer be sealed, as is required.

The aim of the present invention is to overcome the above-indicated disadvantages and for this purpose the invention proposes providing a travel limit stop means wherein the above-indicated connector-sliding contact system has been reversed. According to the invention, the connector is formed by three independent conductor sectors fixed to the cover of the casing and the sliding contacts which are electrically connected are carried by the reducing wheel. Advantageously, the three conductor sectors of the connector are disposed along two circular concentric tracks, the number of sliding contacts then being reduced by one unit and the two remaining sliding contacts being formed by the two teeth of a fork-shaped member carried by the reducing wheel. The device according to the invention therefore permits the omission of one sliding contact and consequently a contact point fitted thereto, and at the same time solves the problem of relative positioning of the sliding contacts, as the two remaining sliding contacts are formed from one piece which acts as a double-contact electrical connecting bridge member. The outside diameter of the connector may be greater than that of the reducing wheel, in contrast to the connector of known type wherein the outer diameter was necessarily less than that of the wheel on which it was fixed. Besides the saving of space, and the economy achieved in respect of structure, the device according to the invention provides a simple solution to the problem resulting from reversal in the direction of rotation of the motor. Indeed, in order suitably to orient the two twinned sliding contacts in dependence on the direction of rotation of the motor, it is sufficient to provide an additional fixing hole on the wall of the reducing wheel, without the provision of such hole detrimentally affecting the sealed nature of the reducing unit casing. Finally, in accordance with another advantageous feature of the device according to the invention, the reducing wheel which carries the twinned sliding contacts may advantageously comprise a plurality of regularly spaced fixing holes to permit angular positioning of the twinned sliding contacts on the reducing wheel and therefore pre-setting in respect of the end-of-travel stop position.

The present invention therefore concerns a travel limit stop device for a drive mechanism, in particular for a motor vehicle window wiper, said mechanism comprising an electric motor to which there is connected an output wheel housed in a casing which is closed by a cover disposed facing said wheel, the travel limit stop device comprising two sliding contacts capable of being displaced on one of the concentric circular tracks of a connector, the co-operation of the sliding contacts and the connector providing either for a supply to the armature member of the motor or short-circuiting of the armature member to cause the motor to come to an abrupt halt, the sliding contacts being carried by the output wheel and being electrically connected to each other, the connector being fixed on the cover of the casing and comprising three sectors which are electrically insulated from each other, characterised in that the three sectors define two concentric circular tracks and that that one of the three conductor sectors which is connected to the first terminal of the supply source for the motor is in the form of an open ring while the conductor sector which can be electrically connected to the induction member of the motor is in the form of a closed ring which is disposed concentrically with respect to said open ring, the third sector being connected to the second terminal of the motor supply source.

In a preferred embodiment, the two sliding contacts are formed by the teeth of a metal fork-shaped member, the two sliding contacts being convergent towards a connecting lug intended to be inserted into a fixing hole of suitable shape provided in the front wall of the output wheel; the two twinned sliding contacts of the fork-shaped member are each formed by an elastically deformable flexible blade of U-shaped longitudinal outline, one of the ends of the U-shape being extended by the connecting lug while the other end carries a contact point mounted thereon; the closed ring has two portions of different diameters; a smaller-diameter portion disposed within the open ring and a larger-diameter portion disposed in peripheral alignment with the open ring; the outer circular track of the connector is formed on the one hand by the conductor sector which is connected to the first terminal of the motor supply source and on the other hand by the larger-diameter portion of the conductor sector which is connected to the motor armature member; the inner circular track of the connector is formed on the one hand by the smaller-diameter portion of the conductor sector which is connected to the armature member of the motor and on the other hand by the conductor sector which is connected to the second terminal of the motor supply source; the three conductor sectors of the connector comprise, outside the two circular concentric tracks, lobes apertured with openings which are intended to receive riveting lugs of an electrically insulating support plate, for example of moulded plastics material; the riveting lugs are moulded with the support plate; the latter is fixed by any suitable means, for example by a detent clipping action, on the cover of the casing; the three conductor sectors are fixed by ultrasonic crushing of the projecting part of the riveting lugs which pass through the openings provided for that purpose in the lobes of the three conductor sectors; the three conductor sectors are produced by cutting out from a single metal foil, the three sectors then being connected to each other by narrow metal zones forming mechanical connecting bridge means, the bridge means being broken after the three sectors have been fixed on the support plate.

In an alternative embodiment, the cover may itself be moulded from plastics material, thereby eliminating the support plate and permitting the three sectors to be directly set in position.

In another alternative embodiment, the closed ring which forms a conductor sector of the connector is a circular ring connected to the armature member of the motor and disposed entirely within the open ring to form the inner circular track of the connector, the third sector being disposed in the open region of the open ring and forming, with said open ring, the outer circular track of the connector.

In order better to appreciate the subject of the present invention, an embodiment thereof will now be described by way of purely illustrative and non-limiting example, with reference to the accompanying drawings in which.

Figure 1:
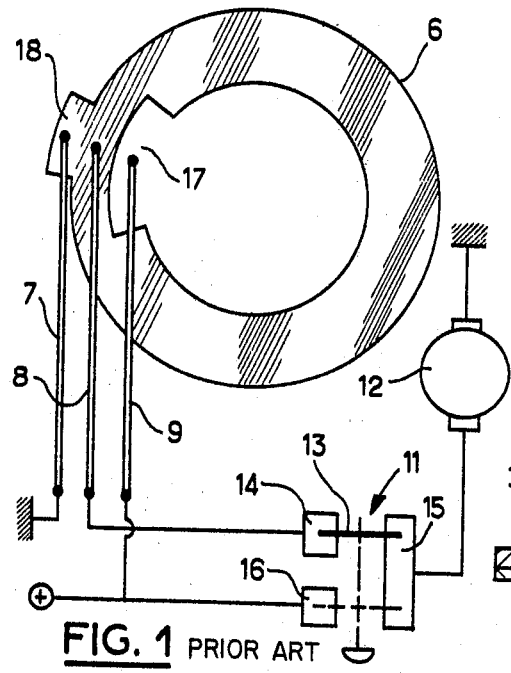
FIG. 1 shows a diagrammatic operational view of a stop device of known type, the device being shown in the rest condition with the motor stopped.
Figure 2:
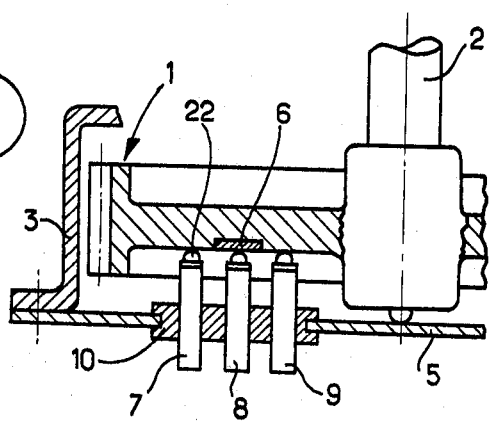
FIG. 2 shows a partly sectional view of the toothed wheel of the endless worm-type reducing unit and the cover of the reducing unit casing, the connector of FIG. 1 being fixed on the toothed wheel and the three sliding contacts being carried by the cover.

Referring to FIGS. 1 and 2 of the drawing, it will be seen that reference numeral 1 denotes a toothed wheel whose tooth arrangement co-operates with the threads of an endless worm of a motor reducing unit used for driving a motor vehicle window wiper. The reducing wheel 1 is carried by a shaft 2 which is at right angles to that of the endless worm (not shown). The endless worm is driven in conventional manner by a motor of permanent magnet inductor type. The reducing unit is disposed within a casing 3 which is sealingly closed by a metal cover 5 disposed facing the reducing wheel 1.

In order to ensure that the wiper blade stops in a given position, provided on the device shown in FIGS. 1 and 2 is a connector 6 formed by a conducting metal disc which is fixed to the interior of an annular housing provided on the front surface of the wheel 1. The connector 6 co-operates with three separate sliding contacts 7, 8 and 9 which pass through an insulating carrier 10 fixed by any suitable means, for example by a detent clipping action, to the cover 5. The three sliding contacts 7, 8 and 9 are each formed by an elastically deformable curved blade whose end carries a contact point 22 which slidingly co-operates with the connector 6.

FIG. 1 of the drawing shows the operating diagram of such a stop device. The sliding contact 7 is connected to ground while the sliding contact 8 can be connected to the armature member 12 of the motor, by way of the terminal 14 of a control switching means 11. The sliding contact 9 is connected to the positive terminal of the supply source and can be connected to the armature member 12 of the motor by way of the terminal 16 of the control switching means 11. The latter which is mounted on the dashboard of the vehicle has two positions: a position which is referred to as the "end-of-travel stop position" when the movable switching member 13 forms an electrical connection between the contacts 14 and 15, and a position referred to as the "operating position" when the switching member electrically connects the contacts 16 and 15, with the contact 15 being connected to the induction member 12.

The connector 6 forms three concentric circular tracks along each of which passes one of the three sliding contacts, when the reducing wheel 1 rotates. The most inward circular track comprises a non-conducting portion 17 formed by an opening cut away at the inward edge of the connector 6. The most outward track comprises a conductor portion 18 which projects from the outer edge of the connector 6. The sliding contact 7 bears against the outer track, the sliding contact 9 bears against the inner track and the sliding contact 8 bears against the central track.

When the control switching means 11 is in the operating position, that is to say, when an electrical connection is made between terminals 16 and 15 by the movable switching member 13, the armature member 12 of the motor is connected to the positive terminal of the supply so that the motor is in operation and the wiper is actuated. If the control switching means is put into the "end-of-travel stop position", that is to say, if the switching member 13 is moved to make an electrical connection between terminals 14 and 15, the motor is supplied with electricity until the sliding contact 7 which is connected to ground comes into co-operating relationship with the conductor sector 18 and at the same time the sliding contact 9 which is connected to the supply source comes onto the non-conductor sector 17 of the connector 6; in this position which is the position shown in FIG. 1, the armature member of the motor is short-circuited, the effect of which is to stop the window wiper in a given position which is its rest position.

FIGS. 3 to 6 of the drawing show a travel limit stop device according to the invention. In this device, the three independent sliding contacts 8 and 9 are replaced by three corresponding conductor sectors 37, 38 and 39 of a connector carried by the wall of the cover 5, while two twinned sliding contacts 20 and 21 carried by the reducing wheel 1 can be moved on the sectors 37 to 39. The system comprising the sliding contacts 7, 8 and 9 and the connector 6 as described above has thus been reversed, as the connector 6 is now fixed to the cover 5 and the two twinned sliding contacts 20 and 21 are carried by the reducing wheel 1.

Figure 3:
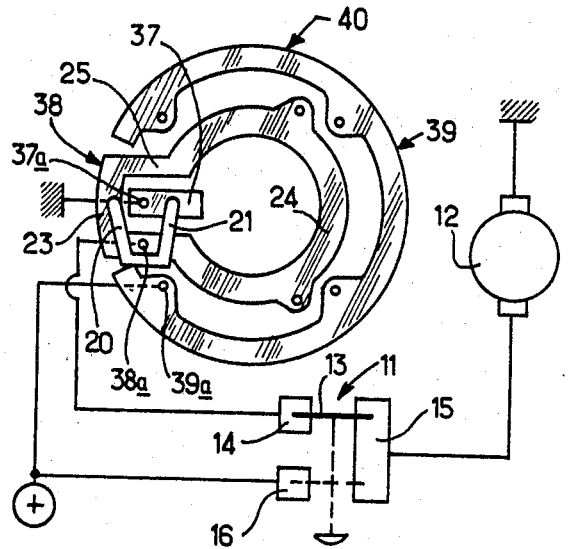
FIG. 3 shows a diagrammatic operational view of the travel limit stop device according to the invention, the device being shown in the rest position, with the motor stopped.
Figure 4:
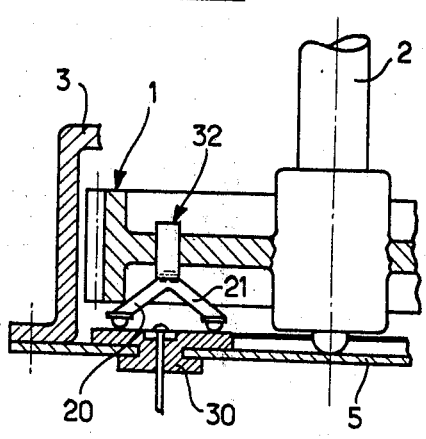
FIG. 4 shows a partly sectional view of the toothed wheel of the endless worm-type reducing unit and the cover of the reducing unit casing, the connector of FIG. 3 being fixed on the wall of the cover and the two sliding contacts being carried by the toothed wheel.

FIG. 3 shows the circuit diagram of the connector 40: the conductor sector 39 is connected by a connection 39a to the positive supply terminal and to the terminal 16 of the control switching means 11; the conductor sector 38 is connected by a connection 38a to the terminal 14 of the switching means and the conductor sector 37 is connected to ground by its connection 37a. The conductor sector 38 is in the form of a closed ring having two portions of different concentric diameters: a small-diameter portion 24 which is connected to the larger-diameter portion 23 by two radial connecting portions 25 and 26.

The connector 40 defines two concentric circular tracks along which pass the two contact points 22 of the twinned sliding contacts 20 and 21 when the reducing wheel 1 is rotated. The outer circular track is formed on the one hand by the conductor sector 39 and on the other hand by the larger diameter portion 23 of the conductor sector 38, said portion being disposed in alignment with the open ring formed by the conductor sector 39. Thus, in the course of operation, the contact point 22 of the sliding contact 20, moving along the circular track which is selected therefor on the connector 40, slidingly co-operates with the sector 39 or the portion 23 of the sector 38. The inner circular track of the connector 40, which is described by the contact point 22 of the sliding contact 21, is formed by the smaller-diameter portion 24 of the conductor sector 38 and by the radial conductor sector 37 which is disposed within the conductor sector 38 in the space defined between the two connecting portions 25 and 26 on the one hand and the larger-diameter portion 23 on the other hand.

Projecting from its inward edge, the conductor sector 39 comprises three lobes in which openings 27 are provided. The three lobes are disposed inwardly of the outer circular track described by the sliding contact 20. In the same way, the sector 38 is provided on its outer edge, outwardly of the inner circular track, with three lobes in which openings 28 are provided; the sector 37 is also provided with an opening 29, inwardly of the inner circular track. The openings 27, 28 and 29 are intended to have passed therethrough riveting lugs which are formed integrally with an electrically insulating support disc 30 which is fixed to the metal cover 5 of the casing by any suitable means, for example by a detent clipping action. The support disc 30 is advantageously made of moulded plastics material. Once the riveting lugs of the support disc 30 have been set in position in the corresponding openings 27, 28 and 29 of the three sectors, the projecting portion of the lugs is crushed in known manner by the application of ultrasonic energy.

Figure 6:
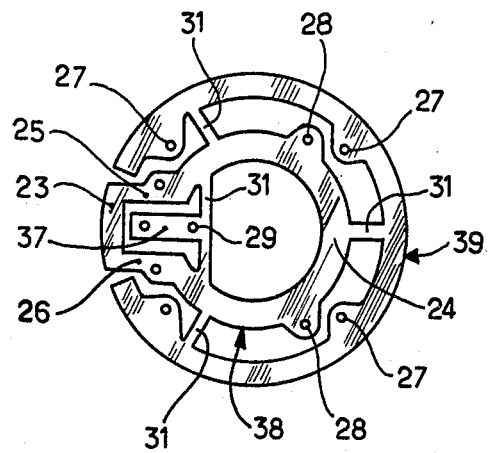
FIG. 6 shows a plan view of a conducting foil which has been cut out to form the connector of the device according to the invention.

In order to facilitate placing and relative positioning of the three conductor sectors 37, 38 and 39 on the support disc 30, the sectors are formed from a single metal foil or sheet which is cut to shape by stamping or pressing. As can be seen from FIG. 6 of the drawing, narrow regions of conducting metal forming connecting bridge means 31 are allowed to remain between the three sectors of the cut-out metal sheet. Thus, the two sectors 38 and 39 are connected by three regularly spaced connecting bridge means 31 which are disposed in the annular space between the two sectors 38 and 39. In the same way, the sector 37 is connected to the sector 38 by two connecting bridge means 31. The cut-out metal sheet as shown in FIG. 6, that is to say, the three sectors 37, 38 and 39 connected by the connecting bridge means 31, is set in place on the moulded plastics support disc 30 by engagement of the riveting lugs into the openings 27, 28 and 29. Circular recesses are advantageously provided on the support disc 30, in line with the connecting bridge means 31. After the ultrasonic riveting operation, the connecting bridge means 31 which provided the mechanical connection between the three conducting sectors 37, 38 and 39 are broken for example by punching.

In this embodiment, the connections 37a, 38a and 39a of the three sectors are male plugs of the "AMP" type permitting rapid connection to outside connecting means.

Figure 5:
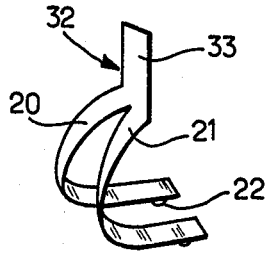
FIG. 5 shows a perspective view of the twin contacts of the device according to the invention.

As can be seen in particular from FIG. 5, the two twinned sliding contacts 20 and 21 form the two teeth of a single fork-shaped member which is generally indicated by reference numeral 32. The two twinned sliding contacts 20 and 21 are in the form of two elastically deformable flexible blades which converge towards a connecting lug 33. Each sliding contact is of longitudinally curved U-shape outline, the free end of the U-shape carrying the contact point 22 secured thereto, while its other end is connected to the lug 33. The two twinned sliding contacts 20 and 21 are fixed by their connecting lug 33 in a hole provided for this purpose in the front wall of the reducing wheel 1 between its hub and its peripheral tooth assembly.

The member 32 can be fixed to the reducing wheel 1 by any suitable means, for example by a detent clipping action in respect of the connecting lug 33 within the fixing hole which receives it. This arrangement can be easily adapted for rotation of the motor and consequently the reducing wheel 1 in the opposite direction. In such a case, it is in fact necessary for the two twinned sliding contacts 21 to be suitably oriented, in dependence on the direction of rotation of the reducing wheel, which can be achieved without difficulty by providing for example on the reducing wheel, an additional fixing hole in which the member 32 can be secured by a detent clipping action, when the orientation of the two twinned sliding contacts is to be altered. In the known construction shown in FIGS. 1 and 2, it was absolutely necessary for the cover 5 to be provided with a different arrangement in respect of the carrier 10 for the three sliding contacts, for rotation of the motor in the opposite direction, that is to say, an additional opening which was capable of possibly receiving the carrier 10 and which obviously had to be blocked off, when it was not being used, as otherwise the reducing unit casing would no longer have been sealed.

Arranging the sliding contacts on the reducing wheel has the further advantage of permitting easy pre-adjustment of the end-of-travel stop position for the window wiper. For this purpose, the reducing wheel 1 may be provided with a series of fixing holes which are regularly spaced from each other and each of which is capable of receiving the connecting lug 33 of the two twinned sliding contacts. Angular positioning of the two twinned sliding contacts relative to the wheel 1 provides for coarse adjustment of the stop position, which can be supplemented by fine adjustment which is effected by positioning the window wiper blade relative to its drive shaft. The stop device shown in FIGS. 1 and 2 does not permit adjustment of this kind since it would result in the cover 5 being provided with a series of holes which would have to be blocked after adjustment in order to keep the reducing unit casing sealed.

The maximum outside diameter of the connector 6 in FIGS. 1 and 2 was necessarily less than that of the reducing wheel 1 since it was fixed to the front face of the wheel between the hub and the peripheral teeth. In the stop device according to the invention, the outer diameter of the connector can be equal to or slightly greater than the diameter of the reducing wheel, as measured at the crest of the teeth (see FIG. 4), hence resulting in a saving in space. In addition, the stop device according to the invention makes it possible to do away with a sliding contact (two twinned sliding contacts 20 and 21 instead of three independent sliding contacts 7, 8 and 9) while also providing a solution to the problem of relative positioning of the sliding contacts, insofar as the sliding contacts are made in one piece, which was obviously not possible with the known stop device since the three sliding contacts 7, 8 and 9 had to be electrically insulated from each other.

The mode of operation of the fixed stop device according to the invention is similar in all respects to that of FIGS. 1 and 2. By putting the control switching means 11 into the "operating" position, that is to say, by making an electrical connection between terminals 16 and 15 by means of the movable member 13, the user of the device causes the armature member 12 of the motor to be connected to the positive terminal of the supply and consequently causes drive of the motor and the sweep movement of the window wiper. If the user puts the control switching means into the "end-of-travel stop position" by moving the movable switching member 13 between the terminals 14 and 15, the motor stops as soon as the sliding contacts 20 and 21 make an electrical connection between the grounded conductor sector 37 and the sector 38 which is connected to the terminal 14 of the switching means. This stop position is shown in FIG. 3: the armature member 12 of the motor is connected to the conductor sector 37 which is grounded by means of the bridge formed by the two twinned sliding contacts 20 and 21 of the conductor sector 38 and the terminals 14 and 15 which are electrically connected by the movable member 13 of the control switching means. If the two twinned sliding contacts 20 and 21 are not in the position shown in FIG. 3 at the moment that the switching means moves into the end-of-travel stop position, the armature member 12 of the motor is connected to the positive terminal of the supply source by way of the conductor sector 39, the bridge formed by the two sliding contacts 20 and 21, the conductor sector 38 and the electrical connection between terminals 14 and 15 of the switching means. The motor can therefore continue to rotate until the two twinned sliding contacts 20 and 21 which are entrained by the reducing wheel 1 come into the stop position shown in FIG. 3 in which the armature member 12 is then short-circuited.

Figure 7:
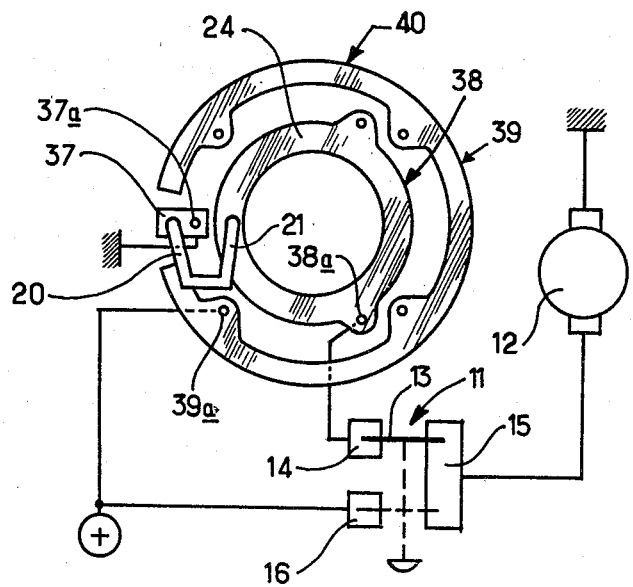
FIG. 7 shows a similar view to that shown in FIG. 3, illustrating an alternative embodiment of the connector of the device according to the invention.

FIG. 7 shows an alternative embodiment of the connector of the device according to the invention. Such a connector also comprises the three conductor sectors 37, 38 and 39 which are electrically insulated from each other and which are disposed along two concentric circular tracks over which move the two contact points 22 of the twinned sliding contacts 20 and 21. The electrical connection of the three conductor sectors is also unchanged. However, in this embodiment, the sector 38 is in the form of a closed circular ring which is entirely disposed within the sector 39 in the form of an open circular ring. In this case, the sector 38 on its own forms the inner circular track of the connector. The outer circular track is in turn closed on the one hand by the sector 39 which is in the form of an open ring and on the other hand, by the sector 37 which is inserted into the open region of the above-mentioned open ring. The mode of operation of the fixed stop device with the connector of FIG. 7 is identical in all respects to the mode of operation described above in respect of the fixed stop device provided with the connector of FIG. 3.

I claim:

1. In a travel limit stop device for a drive mechanism, especially for a motor vehicle window wiper, said mechanism comprising an electric motor which drives an output wheel housed in a casing which is closed by a cover disposed facing said wheel, the travel limit stop device comprising two sliding contacts capable of being moved relative to a circular connector, the co-operation of the sliding contacts and the connector providing either for an electrical supply source to the motor or for short-circuiting of the armature member of the motor to cause the motor to come to an abrupt halt, the improvement whereby the sliding contacts are carried by the output wheel and are electrically connected to each other and the connector is fixed on the cover of the casing and comprises three conductor sectors which are electrically insulated from each other, the three sectors defining two concentric circular tracks over each of which a sliding contact can be moved, a first conductor sector for connection to a first terminal of the supply source for the motor being in the form of an open ring, a second conductor sector for connection to the armature member of the motor being in the form of a closed ring which is disposed concentrically with respect to said open ring and a third conductor sector being for connection to a second terminal of the motor supply source.

2. A device according to claim 1 wherein said two sliding contacts are formed by the teeth of a bifurcate metal member, the two sliding contacts converging towards a connecting lug adapted for insertion into a fixing hole of suitable shape provided in the front wall of the output wheel.

3. A device according to claim 2 wherein the two sliding contacts of the bifurcate member are each formed by an elastically deformable flexible blade of U-shaped longitudinal outline, one of the ends of the U-shape being extended to form the connecting lug while the other end carries a contact point mounted thereon.

4. A device according to claim 1 wherein the three sectors of the connector are provided in positions away from the paths traversed by the contacts with lobes with openings for receiving riveting lugs.

5. A device according to claim 4 wherein the riveting lugs for fixing the three conductor sectors are provided on the cover of the casing which is of insulating material.

6. A device according to claim 5 wherein the riveting lugs for fixing the three conductor sectors are mounted on a carrier plate of insulating material which is fixed on the metal cover of the casing and the fixing of the three conductor sectors is effected by crushing the projecting part of each riveting lug which passes through the opening provided for that purpose in the lobes of each of the three conductor sectors.

7. A device according to claim 1 wherein the three conductor sectors are produced from a single metal sheet in a form in which the three sectors are connected together by narrow metal zones forming mechanical connecting bridge means and the connecting bridge means are broken after the three sectors have been fixed onto a support plate or attached to the cover of the casing or onto the cover of the casing itself.

8. A device according to claim 1 wherein the output wheel is a toothed wheel of a speed reducing unit for a window wiper motor.

9. A device according to claim 1 wherein the closed ring which forms the second conductor sector of the connector has a first portion of diameter smaller than that of the open ring first conductor sector, and a second portion arranged to protrude through the opening in the open ring of the first conductor sector.

10. A device according to claim 9 wherein the outer circular track of the connector is formed by the first conductor sector together with the protruding portion of the closed ring sector of the second conductor sector.

11. A device according to claim 9 wherein the inner circular track of the connector is formed by the first portion of the second conductor sector, together with the third conductor sector.

12. A device according to claim 1 wherein the closed ring which forms the second conductor sector of the connector is an annular ring which is disposed entirely within the open ring of the first conductor sector and forms the inner circular track of the connector and the third sector is disposed in the opening of the open ring and forms with said open ring the outer circular track of the connector.

* * * * *